United States Patent [19]
Burnett

[11] Patent Number: 5,266,090
[45] Date of Patent: Nov. 30, 1993

[54] MULTI-SIDED AIR FILTER WITH WRAPAROUND FILTER MEDIA

[75] Inventor: Gilbert W. Burnett, Rockwall, Tex.

[73] Assignee: Dust Free, Inc., Royse City, Tex.

[21] Appl. No.: 947,748

[22] Filed: Sep. 21, 1992

[51] Int. Cl.⁵ .................... B01D 29/05; B01D 35/26; B01D 53/04

[52] U.S. Cl. .................... 55/333; 55/471; 55/493; 55/DIG. 5; 96/135; 96/151

[58] Field of Search ............ 55/316, 318, 332, 333, 55/387, 471, 472, 480, 484–487, 493, DIG. 5

[56] References Cited

U.S. PATENT DOCUMENTS

| | | | |
|---|---|---|---|
| 1,426,196 | 8/1922 | Jordahl . | |
| 1,521,575 | 12/1924 | Wittemeier . | |
| 1,544,690 | 7/1925 | Shurtleff . | |
| 1,887,737 | 11/1932 | Shurtleff . | |
| 2,055,774 | 9/1936 | Ray | 183/49 |
| 2,061,535 | 11/1936 | Davies | 98/94 |
| 2,114,761 | 4/1938 | Crider | 55/471 |
| 2,214,750 | 9/1940 | Myers | 183/49 |
| 2,313,676 | 3/1943 | Shaver | 55/471 X |
| 2,347,334 | 4/1944 | Schmieg | 55/484 X |
| 2,362,933 | 11/1944 | Schaefer | 55/471 X |
| 2,552,847 | 5/1951 | Farr et al. . | |
| 2,575,499 | 11/1951 | Manow | 183/49 |
| 2,675,094 | 4/1954 | Young | 183/74 |
| 2,764,251 | 9/1956 | Jessop . | |
| 2,778,441 | 1/1957 | Herriott | 55/471 X |
| 2,810,453 | 10/1957 | Kemnitz | 55/471 X |
| 3,118,749 | 1/1964 | Acacia | 55/484 X |
| 3,186,149 | 6/1965 | Ayers | 55/387 |
| 3,222,848 | 12/1965 | Koble, Jr. | 55/131 |
| 3,308,610 | 3/1967 | Springer et al. | 55/471 |
| 3,399,516 | 9/1968 | Hough, Jr. et al. | 55/487 |
| 3,408,438 | 10/1968 | Staunton | 55/484 X |
| 3,413,782 | 12/1968 | Bartlett | 55/487 X |
| 3,498,032 | 3/1970 | Scott | 55/471 |
| 3,509,696 | 5/1970 | Thompson | 55/131 |
| 3,523,409 | 8/1970 | Patterson | 55/471 |
| 3,626,669 | 12/1971 | Cardiff | 55/126 |
| 3,768,233 | 10/1973 | Mateson | 55/100 |
| 3,812,370 | 5/1974 | LaViolette | 250/527 |
| 3,912,472 | 10/1975 | Marble | 55/484 |
| 4,016,080 | 4/1977 | Williams | 210/284 |
| 4,252,547 | 2/1981 | Johnson | 55/234 |
| 4,323,374 | 4/1982 | Shinagawa et al. | 55/132 |
| 4,377,399 | 3/1983 | Bryson | 55/472 X |
| 4,385,911 | 5/1983 | Popeil et al. | 55/316 |
| 4,477,270 | 10/1984 | Tauch | 55/472 X |
| 4,504,290 | 3/1985 | Pontius | 55/316 |
| 4,627,862 | 12/1986 | Frei et al. | 55/316 |
| 4,666,478 | 5/1987 | Boissinot et al. | 55/279 |
| 4,749,390 | 6/1988 | Burnett et al. | 55/316 |
| 4,767,426 | 8/1988 | Daly et al. | 55/487 |
| 4,905,340 | 3/1990 | Gutschmit | 55/471 X |
| 5,102,436 | 4/1992 | Grabowski | 55/487 X |
| 5,125,939 | 6/1992 | Karlsson | 55/316 |
| 5,156,662 | 10/1992 | Downing et al. | 55/493 |

FOREIGN PATENT DOCUMENTS

| | | | |
|---|---|---|---|
| 55-24524 | 2/1980 | Japan . | |
| 58-092439 | 6/1983 | Japan | 55/486 |
| 8900532 | 10/1990 | Netherlands | 55/472 |
| 252610 | 6/1926 | United Kingdom | 55/316 |
| 1322718 | 7/1973 | United Kingdom | 55/487 |
| 1346762 | 2/1974 | United Kingdom | 55/316 |
| 2084897 | 4/1982 | United Kingdom | 55/486 |

*Primary Examiner*—Robert Spitzer
*Attorney, Agent, or Firm*—Vinson & Elkins

[57] ABSTRACT

A filtering unit having multiple filtering sides uses one or more filtering elements wrapped around an inner housing containing a blowing device. Outer housing panels are disposed about the filtering elements. The filtering elements and outer housing panels are held in place by one or more stays.

13 Claims, 2 Drawing Sheets

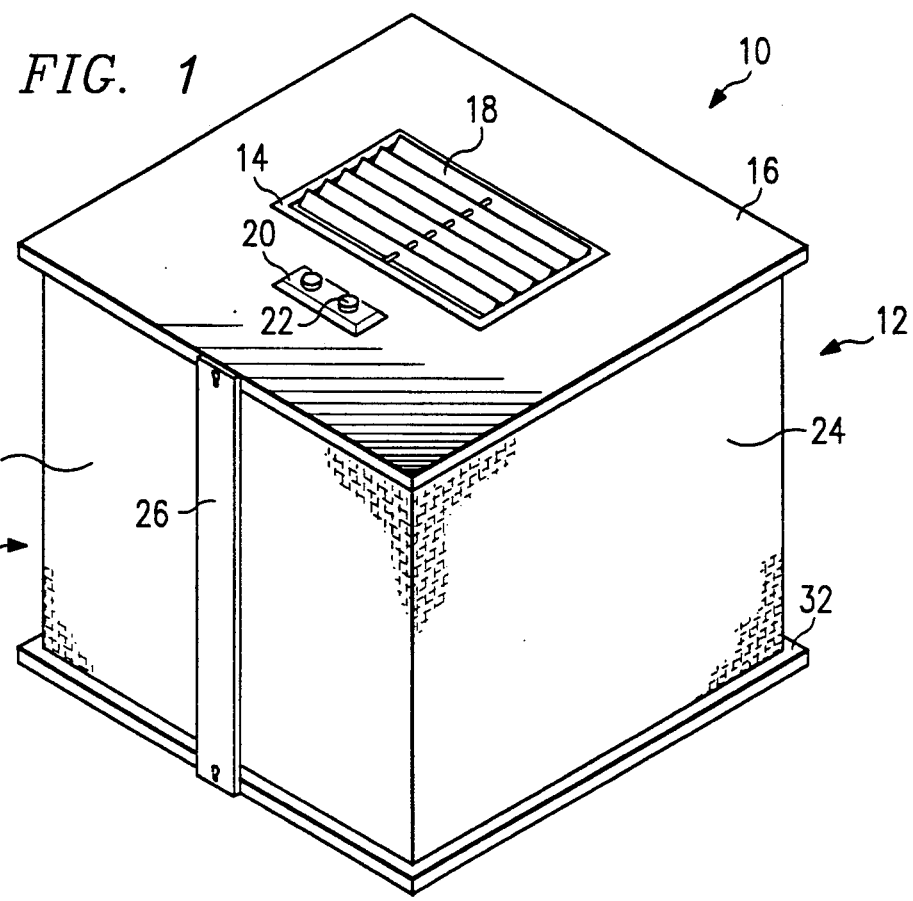
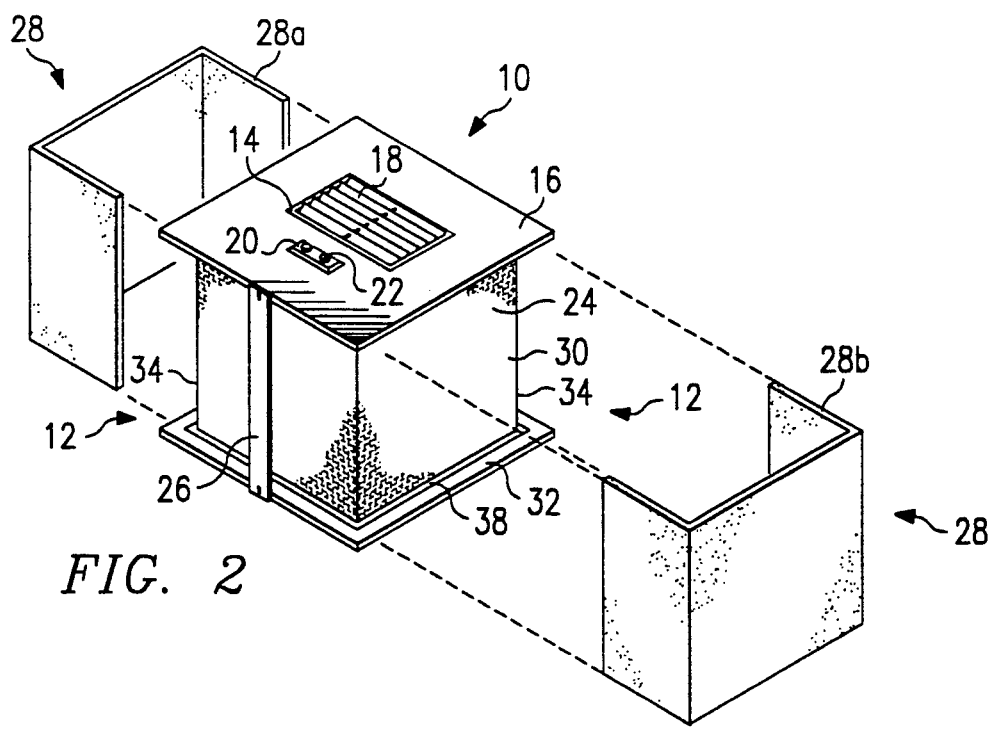

MULTI-SIDED AIR FILTER WITH WRAPAROUND FILTER MEDIA

TECHNICAL FIELD OF THE INVENTION

This invention relates in general to a method and apparatus for filtering air, and particularly to a method and apparatus for filtering air with a multi-sided filter.

BACKGROUND OF THE INVENTION

In filtering air, it is desirable that the unfiltered air pass slowly through the filtering material in order to maximize the filtering effect. However, it is also desirable that the air be filtered as quickly as possible in order to minimize the time needed to filter the air in a given room. A solution to these conflicting goals is to provide a large surface area for the filtering material through which the unfiltered air travels.

In order to increase the surface area of the filtering material without unduly adding to the size of the filtering device, multi-sided filtering units or circular filtering units have been devised. In these units, the entire perimeter of the filtering device houses filtering material, thereby maximizing the area of the filtering material in relation to the size of the filtering device.

One such filtering device is described in connection with U.S. Pat. No. 4,749,390 to Burnett et al. In this device, each of the four sides of the filtering device houses one or two frames holding the filtering media. While this device is extremely effective in filtering air, the structure of the filtering device and the containers for the filtering media are somewhat complex to manufacture. Therefore, this device is relatively expensive.

Similarly, with present-day circular filters, the filtering media is housed in a cylindrical container, much like a carburetor air filter. These units also are expensive due to the complexity in constructing the unit to receive replaceable filters. Additionally, the cost of the filter media is relatively high, especially if odor adsorbents are included. The consumer is also given very little choice in filtering materials since the high cost of manufacturing requires high volume production levels of selected products.

Therefore, a need has arisen in the industry for an apparatus and method for filtering air using a multi-sided air filter with a reduced cost of construction.

SUMMARY OF THE INVENTION

In accordance with the present invention, a method and apparatus is provided which substantially reduces the cost associated with prior multi-sided air filters.

In the present invention, an air filtering device comprises an inner housing around which one or more filtering elements are wrapped. An outer housing contains the filtering elements between the inner and outer housings. A blower having an intake and exhaust disposed within the inner housing such that the intake of the blower draws air through the filtering elements and the exhaust outputs filtered air.

The present invention provides significant advantages over the prior art. Since the filtering media may be wrapped around the inner housing, the cost associated with the frames for the filtering media and for the construction of the housing for receiving the frames is eliminated. A plurality of different filtering elements may be disposed between the inner and outer housings in order to combat particular allergy problems.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a perspective view of the filtering unit;

FIG. 2 illustrates an exploded view of the filtering elements disposed about the inner housing of the filtering unit;

DETAILED DESCRIPTION OF THE INVENTION

Figure 3:
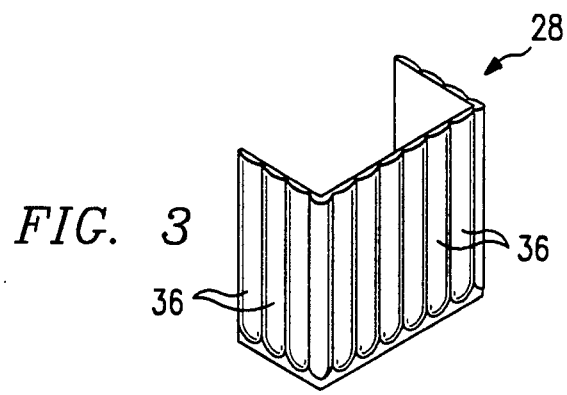
FIG. 3 illustrates a filter element for use in the present invention having channels for holding a filtering media.

The preferred embodiment of the present invention and its advantages are best understood by referring to FIGS. 1-5 of the drawings, like numerals being used for like and corresponding parts of the various drawings.

FIG. 1 illustrates a perspective view of the filtering unit 10 of the present invention. In general, the operation of the filtering unit 10 is similar to the four-sided air filter described in connection with U.S. Pat. No. 4,749,390 to Burnett et al., entitled "Four-Sided Air Filter", issued Jun. 7, 1988, which is incorporated by reference herein. The filtering unit 10 has four filtering sides 12 through which air is drawn by an internal blower (not shown). The exhaust from the blower is output through vent 14 of top panel 16. Vent 14 has movable louvers 18 which allow the user to control the direction of the filtered air. Top panel 16 also includes a speed control knob 20 and an on/off light 22.

Each of the filtering sides include a filtering element (shown in FIG. 2) surrounded by an outer housing 24. Removable stays 26 are disposed on opposite sides of the filtering unit 10 to contain the filtering elements and outer housing.

FIG. 2 illustrates an exploded view of the filtering unit 10 with the outer housing 24 removed, thereby exposing the filtering elements 28 (referenced individually as filtering elements 28a-b) and inner housing 30. Inner housing 30 is disposed between the top panel 16 and base 32. The inner housing 30 comprises a rigid screen or mesh having appropriately sized perforations to allow a relatively unrestricted air flow therethrough. Within the inner housing 30, the blower (not shown) is mounted to the top panel 16. In the preferred embodiment, the blower is a squirrel cage or "wheel-type" blower, which is more efficient and less noisy than a "propeller-type" blower. The blower may operate on either AC or DC, or both, depending upon the intended environment for the filtering unit 10. DC operation allows the filtering unit 10 to be used in a motor vehicle to filter traffic fumes, often a serious problem to sensitive users.

Filtering elements 28 are disposed about the inner housing 30 to completely surround the four filtering sides 12 with a filtering material. The filtering elements 28a-b are held in place by the stays 26. Stays may be positioned to add a decorative feature to the air filter. Alternatively, a fastening device, such as a hook-and-loop fastener (sold under the tradename VELCRO), could be attached to the adjoining ends of the filtering elements 28 to hold the filtering elements 28a-b together or to the inner housing 30. In FIG. 2, two filtering elements 28 are shown; however, for smaller units, a single filtering element may be wrapped around all four filtering sides 12 of the filter unit.

Optionally, a second layer of filtering elements 28 may be placed over the first layer of filtering elements 28 to provide additional filtering capability. For example, polyurethane foam filtering elements may be used as a first layer to provide filtering of particulate matter and carbon impregnated filter material may be used as a second layer to filter odors.

It is highly desirable that the filtering elements 28 be flexible as to allow bending about the corners 34 of the inner housing 30. Many filters, such as polyurethane particulate filters and electrostatic filters are naturally flexible and well suited for use in the present invention. Other types of filters, such as carbon or potassium permanganate, may be impregnated into a foam or fabric material to provide the necessary flexibility. Alternatively, as shown in FIG. 3, the filtering material, such as carbon or potassium permanganate, may be placed in a filtering element 28 having pockets or channels 36 formed therein for holding the filtering material. The channels could be opened by the user to replace the filtering material as necessary.

As described in U.S. Pat. No. 4,749,390, there are many different combinations of filter elements which can be used to combat particular situations. As described above, one option is to provide two layers of different filtering elements. Another option is to have two corresponding filtering elements 28a and 28b with different filtering properties. As the air is recirculated in the room, it will pass through both filtering elements 28a and 28b. This combination is particularly useful where the two filtering agents are reactive and should not overlie one another.

Figure 4:
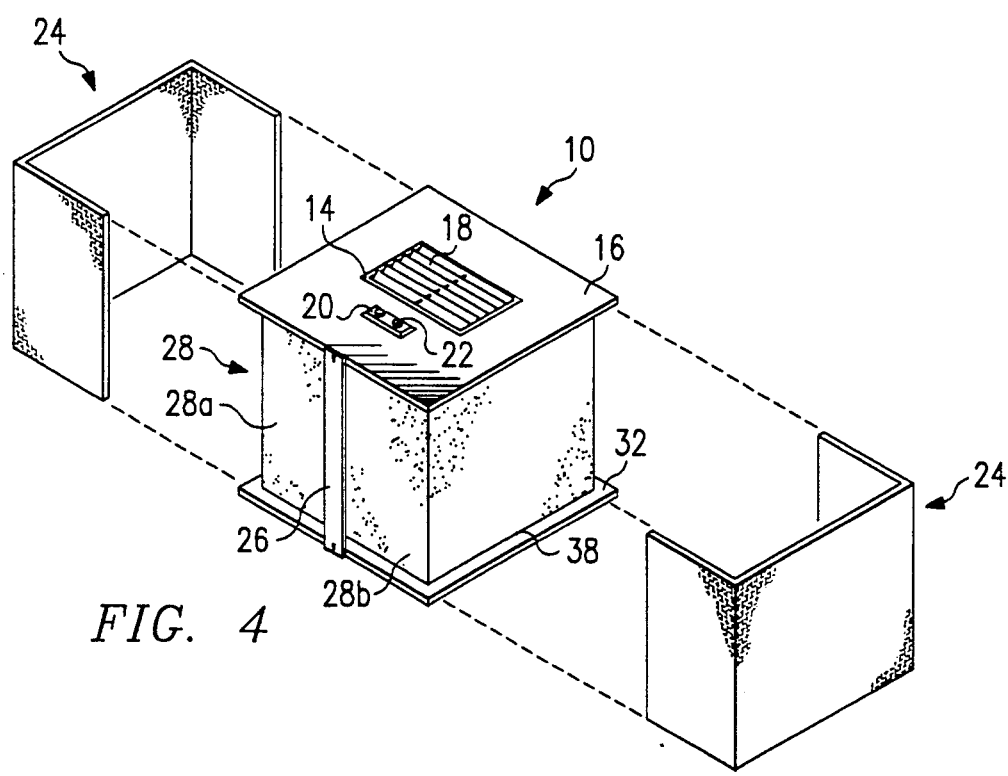
FIG. 4 illustrates an exploded view of the outer housing disposed about the filtering elements.
Figure 5:
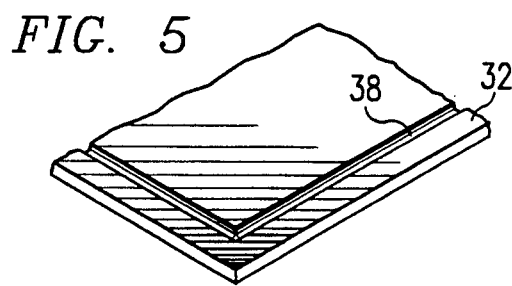
FIG. 5 illustrates a cut-away perspective view of the base of the filtering unit.

FIG. 4 illustrates a perspective view of the filter unit 10 with the outer housing panels 24 exploded therefrom. The outer housing panels 24 are likewise constructed from a flexible material. The top panel 16 and base 32 each have a groove 38 formed therein (shown in greater detail in connection with FIG. 5). The outer housing panels 24 are first inserted into the groove on the top panel 16 which allows the panels to swing clear of the base 32. The outer housing panels are then aligned over the groove 38 in the base 32 and lowered into the groove 38. The groove 38 of base 32 holds the outer housing panels 24 in place, along with the stays 26.

The outer housing panels 24 add a decorative look to the air filter 10 and operate to hold the filtering elements 28 in place. The outer housing panels themselves can be formed of a filtering material, such as a polypropylene electrostatic weave, for providing additional filtering capability.

The present invention provides significant advantages over the prior art. First, the construction of the filtering unit 10 is greatly reduced by simplifying the manner in which the filtering elements are held in place. Second, the filtering elements 28 are themselves significantly less expensive to fabricate, thereby reducing the operating costs of the filter unit 10. Because of the reduced complexity of manufacturing the filtering elements, many different filter media can be produced. The cost reductions, however, are implemented without decreasing the filtering capacity of the unit.

Although the present invention and its advantages have been described in detail, it should be understood that various changes, substitutions and alterations can be made herein without departing from the spirit and scope of the invention as defined by the appended claims.

What is claimed is:

1. An air filtering device comprising:
   an inner housing having multiple sides operable to allow airflow therethrough;
   a blower disposed inside said inner housing;
   one or more filter elements disposed about said multiple sides of said inner housing; and
   an outer housing disposed about said one or more filter elements.

2. The air filtering device of claim 1 and further comprising a bottom panel having a groove formed therein for receiving said outer housing.

3. The air filtering device of claim 2 and further comprising a top panel having a groove formed therein for insertion of said outer housing.

4. The air filtering device of claim 3 and further comprising one or more bars coupled between said top and bottom panels for containing said outer housing and filter elements.

5. The air filtering device of claim 1 wherein said inner housing has four sides operable to allow airflow therethrough.

6. The air filtering device of claim 1 wherein said one or more filtering elements are disposed in multiple layers around said inner housing.

7. The air filtering device of claim 1 wherein said one or more filtering elements comprise two filter elements, each element containing a different filtering medium.

8. The air filtering device of claim 1 wherein said outer housing comprises a screening material.

9. The air filtering device of claim 1 wherein said one or more filter elements comprise one or more filter elements having pockets formed therein for receiving a filter medium.

10. The air filtering device of claim 1 wherein said one or more filter elements comprise a polyurethane material.

11. The air filtering device of claim 1 wherein said one or more filter elements comprise at least one filter element comprising an impregnated filtering material.

12. The air filtering device of claim 11 wherein said impregnated filtering material comprises a filtering material impregnated with carbon.

13. The air filtering device of claim 11 wherein said impregnated filtering material comprises a filtering material impregnated with a potassium permanganate.

* * * * *